United States Patent
Dalal et al.

(10) Patent No.: US 9,666,088 B2
(45) Date of Patent: May 30, 2017

(54) VIDEO-BASED TEACHER ASSISTANCE

(71) Applicant: Xerox Corporation, Norwalk, CT (US)

(72) Inventors: Edul N. Dalal, Webster, NY (US);
Wencheng Wu, Webster, NY (US);
Richard L. Howe, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 213 days.

(21) Appl. No.: 13/961,139

(22) Filed: Aug. 7, 2013

(65) Prior Publication Data
US 2015/0044657 A1 Feb. 12, 2015

(51) Int. Cl.
*G09B 5/02* (2006.01)
*G06K 9/00* (2006.01)
*G07C 9/00* (2006.01)

(52) U.S. Cl.
CPC ........... *G09B 5/02* (2013.01); *G06K 9/00228* (2013.01); *G06K 9/00295* (2013.01); *G06K 9/00335* (2013.01); *G07C 9/00158* (2013.01)

(58) Field of Classification Search
CPC ... G09B 5/02; G09B 5/14; G09B 7/00; G09B 23/02; G08B 21/182; H04N 7/18; A61B 5/1128; G06K 9/00281; G06K 9/00228; G06K 9/00295; G06K 9/00315; G07C 9/00158
USPC ................. 434/308, 236, 362, 118; 600/300; 382/190, 117, 103; 340/5.82; 345/420; 348/143
See application file for complete search history.

(56) References Cited

U.S. PATENT DOCUMENTS

| | | | |
|---|---|---|---|
| 8,170,280 B2* | 5/2012 | Zhao | G06K 9/00295 382/103 |
| 8,457,544 B2 | 6/2013 | German et al. | |
| 2003/0016846 A1* | 1/2003 | Chen | G06K 9/00268 382/117 |
| 2004/0152060 A1* | 8/2004 | Ando et al. | 434/308 |
| 2007/0122036 A1* | 5/2007 | Kaneda | G06K 9/00281 382/190 |
| 2008/0057480 A1* | 3/2008 | Packard | G09B 23/02 434/188 |
| 2010/0075290 A1 | 3/2010 | DeYoung | |
| 2010/0075291 A1 | 3/2010 | DeYoung et al. | |
| 2010/0075292 A1 | 3/2010 | DeYoung | |
| 2010/0157345 A1 | 6/2010 | Lofthus et al. | |

(Continued)

OTHER PUBLICATIONS

U.S. Appl. No. 13/598,098, "Method and System for Automatically Recognizing Facial Expressions Via Algorithmic Periocular Localization", Shreve et al., filed Aug. 29, 2012.

(Continued)

*Primary Examiner* — Eddy Saint-Vil
(74) *Attorney, Agent, or Firm* — Fay Sharpe LLP

(57) ABSTRACT

A video-based teaching aid system and method. Video images are recorded of at least some of a plurality of people in a classroom setting by use of a video camera arrangement. Expressions of the people in the video images are identified by use of an expression recognition module configured to receive the video images from the video camera arrangement. The identified expressions of the people in the video images are correlated with at least one of an event or an outcome of an event occurring in a classroom setting by use of a correlation module. The results of the correlating are outputted by an output device.

21 Claims, 8 Drawing Sheets

(56) References Cited

U.S. PATENT DOCUMENTS

| | | |
|---|---|---|
| 2010/0159432 A1 | 6/2010 | German et al. |
| 2010/0159437 A1 | 6/2010 | German et al. |
| 2011/0151423 A1 | 6/2011 | Venable |
| 2011/0244440 A1* | 10/2011 | Saxon et al. .................. 434/362 |
| 2011/0263946 A1* | 10/2011 | el Kaliouby ......... A61B 5/1128 600/300 |
| 2014/0063236 A1* | 3/2014 | Shreve ............... G06K 9/00228 348/143 |
| 2014/0205984 A1* | 7/2014 | Chapman ...................... 434/308 |
| 2014/0212854 A1* | 7/2014 | Divakaran et al. ........... 434/236 |

OTHER PUBLICATIONS

Chippendale, "Towards Automatic Body Language Annotation", Seventh IEEE Int'l Conf. on Automatic Face and Gesture Recognition (FG '06), pp. 487-492.

Zhu et al., "Face Detection, Pose Estimation, and Landmark Localization in the Wild", Computer Vision and Pattern Recognition (CVPR), Providence, RI, Jun. 2012, 8 pgs.

Zhu et al., "Face Detection, Pose Estimation, and Landmark Localization in the Wild", Computer Vision and Pattern Recognition (CVPR), Providence, RI, Last Updated on Feb. 10, 2013, 2 pgs.

* cited by examiner

VIDEO-BASED TEACHER ASSISTANCE

BACKGROUND

The present application concerns educational management systems, and more particularly educational management systems that employ a video component.

BRIEF DESCRIPTION

A video-based teaching aid system and method. Video images are recorded of at least some of a plurality of people in a classroom setting by use of a video camera arrangement. Expressions of the people in the video images are identified by use of an expression recognition module configured to receive the video images from the video arrangement. The identified expressions of the people in the video images are correlated with at least one of an event or an outcome of an event occurring in a classroom setting by use of a correlation module. The results of the correlating are outputted by an output device.

INCORPORATION BY REFERENCE

U.S. Patent Application Publication No. 2010/0075291 A1, titled Automatic Educational Assessment Service, DeYoung et al., hereby fully incorporated by reference herein.

U.S. patent application Ser. No. 13/598,098, titled Method And System For Automatically Recognizing Facial Expressions Via Algorithmic Periocular Localization, Shreve et al, hereby fully incorporated by reference herein.

Article by Xiangxin Zhu and Deva Ramanan, titled: Face Detection, Pose Estimation, and Landmark Localization in the Wild, CVPR 2012 hereby fully incorporated by reference herein.

Article by P. Chippendale, titled: Towards Automatic Body Language Annotation, Automatic Face and Gesture Recognition 2006, FGR 2006, pgs. 487-492, 7$^{th}$ International Conference hereby fully incorporated by reference herein.

DETAILED DESCRIPTION

The present application is directed to improvements to educational management systems, and more particularly the present concepts are directed to video-based educational management systems.

A discussion of an educational management system is provided in U.S. Patent Application Publication No. 2010/0075291 A1, DeYoung et al., hereby fully incorporated by reference herein. The described educational management system is a web-based teacher support tool for printing, scanning, and scoring tests or other assessments that also manages the score data and produces personalized analytics, rankings, or other evaluation metrics achieved on an assessment, assignment, or test.

Figure 1:
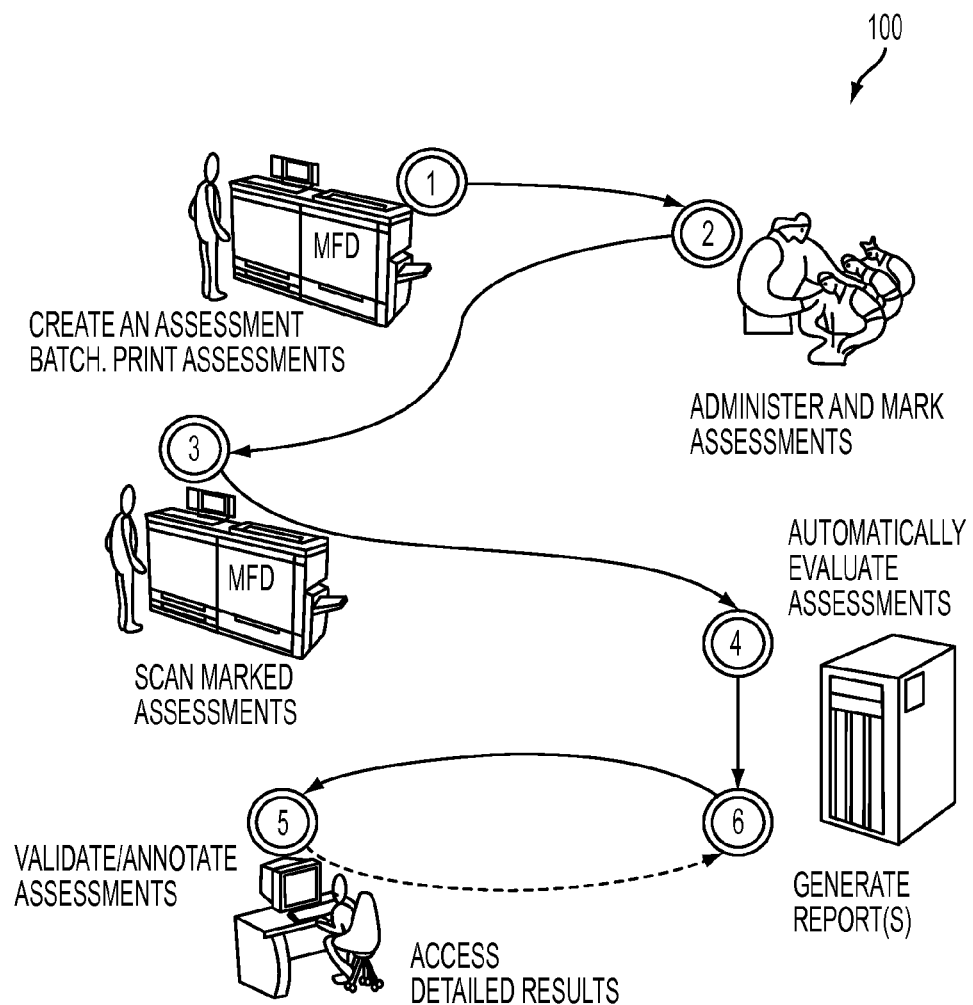
FIG. 1 is a pictorial diagram of the method flow for an existing educational management system.

Referring to FIG. 1, illustrated is an overview 100 of the functional operation for an existing educational management system. At station 1 a multifunctional device (MFD) is provided. Previously, from the desktop, the teacher/educator has input required information regarding an assessment form and student (or number of students) desired, to create an Assessment Batch. Then once the Assessment Batch has been created by the teacher/educator, the assessments (e.g., test questions) are printed at the MFD or any remote printer connected thereto. In one embodiment, an Assessment Batch includes the teacher's name and a student list which includes the names of the students to be included in the batch, the particular assessment form (e.g., test) to be administered to the students in the student list and the creation date of the Assessment Batch.

At station 2, the teacher/educator administers the assessments which are marked. Depending on the type of assessment form, the printed sheets are marked by the teacher/educator or the students.

At station 3, the teacher/educator scans the marked assessments into the system at the MFD. At station 4, the system automatically evaluates the assessments employing image analysis according to established rubrics associated with the assessment form associated with the Assessment Batch and enables the teacher/educator to access the evaluations at station 5 which is illustrated as a remote station such as a teacher's computing device (e.g., personal computer (PC), laptop, tablet, etc.). The teacher/educator validates and/or annotates the assessments and upon receipt of the validation, reports are either viewed electronically at the teacher's desktop or they are printed out at a printer and then viewed in hard copy format.

Figure 2:
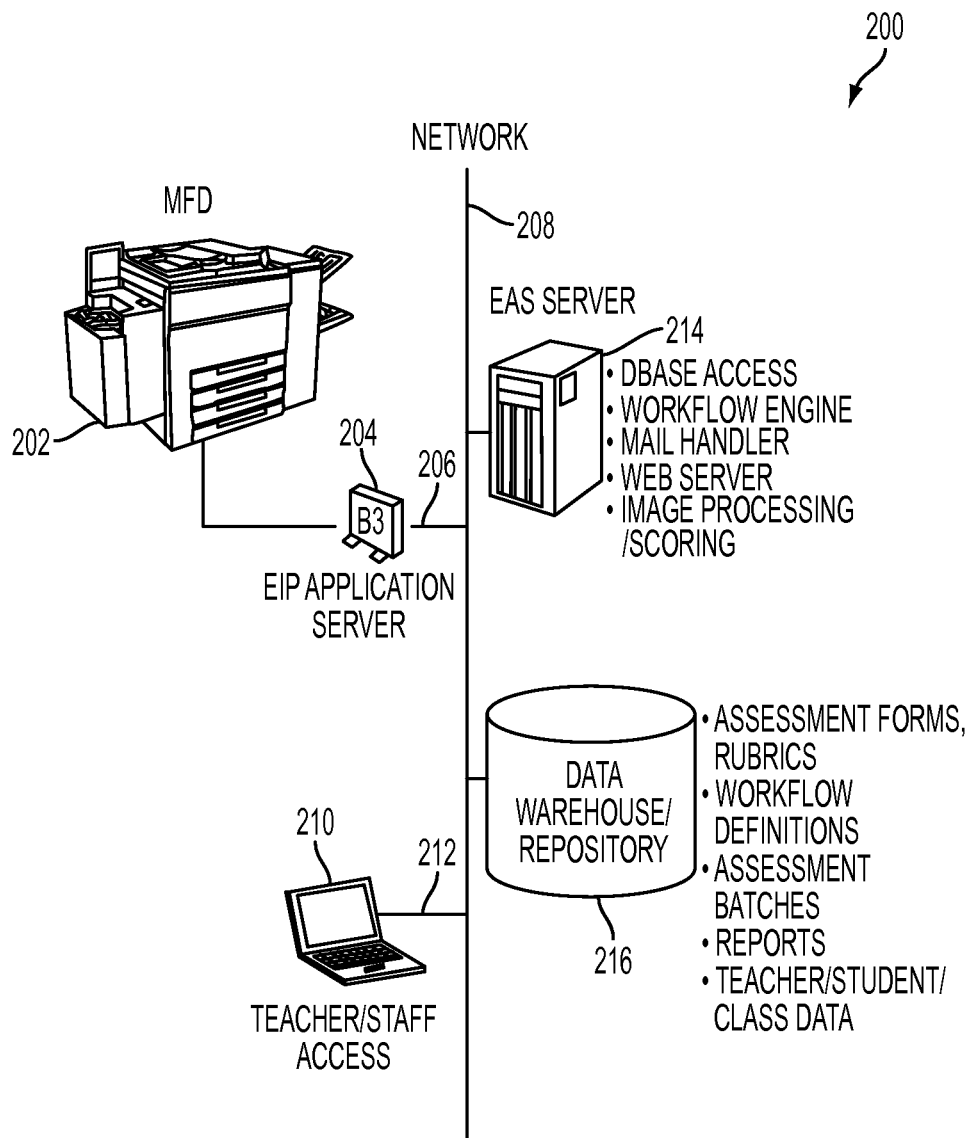
FIG. 2 is a diagram of a general configuration of the system architecture for the educational management system of FIG. 1.

Referring to FIG. 2, the overall architecture of the system 200 employed in FIG. 1 is illustrated pictorially with the MFD 202 connected through an application server 204 along line 206 to a network 208 which may be either a local or wide area network and may include connections to the internet. A remote terminal or other computing device (e.g., laptop, tablet, personal computer, etc.) 210 acting as a teacher/educator access terminal is connected along line 212 to the network 208. A system server 214 is also connected to the network 208 and provides the functions of database access, serves as a workflow engine, mail handler, and web server providing functions of image processing/scoring.

A Data Warehouse/Repository 216 is also connected to the network 208 and contains such items as assessment forms and associated rubrics, workflow definitions, Assessment Batch records, reports and teacher/student/class data and is operable to receive updates and to provide access to data stored therein and remotely over network 208.

As mentioned, the system and method of the referenced disclosure function to assist a teacher/educator by providing automatic evaluation of assessments administered to students based upon established rubrics programmed into the system and employing image analysis. The system and method of the referenced disclosure have the capability to evaluate assessments which are marked with images other than by marking within a box or bubble with respect to multiple choice answers. The system has the ability to scan the marked assessment and lift the manually generated marks made during the administering of the assessment from the preprinted markings on the assessment sheet. The system and method then employ image analysis to identify and evaluate the lifted marks.

The educational management system described above relies on the test (assessment form) results to determine the student's learning level and to analyze strengths and weaknesses.

However, it is known that teachers do not rely solely on test results to determine the students' learning level and to analyze strengths and weaknesses. They observe the students while they are taking tests, and also on an ongoing basis during regular classes, noting how each student reacts to various stimuli.

In consideration of this, an aspect of the present application is to enable educators to do a better job educating students and to enable students to help themselves be better learners as well, goals that are achievable through the collection and analysis of disparate sources of data, over time, all from and pertaining to the process of education. These sources of data (or data sets) include, but are not limited to:

Assessment score data, whether those assessments were administered through educational management systems or not;

Homework and other out-of-class assignments and how students did on those assignments;

Report card grades, standardized testing results, and other numeric measures of student academic performance;

Behavioral records or evaluations of students;

Direct observations and/or records of student performance in the classroom, where "performance" includes how the students behave. This behavior including how they respond to questions asked during teaching/lecture time; the questions they ask during teaching/lecture time; and how they execute an in-class assignment (be that an assessment form or some other activity) including what do they do when, what questions they ask, and any visual and/or audio clues (such as body language, or where they look) that might indicate how they are faring.

The last two bullet points are directed to certain aspects of the present application. Particularly, the present application discloses utilization of video-based expression recognition which includes at least one of body posture or expressions (also called body language), gestures, facial expressions, and/or eye movements of students, to assist the teacher in understanding the learning state of the students. Such understanding enables the teacher to take a variety of actions such as, but not limited to, repeating a particular topic that was generally not well understood, or concentrate on a few students (or a specific student) who is in need of special attention.

Useful facial and/or body expressions that may be recognized by such a system include: attentiveness, boredom, confusion, frustration, relief, calmness, distress, surprise, panic, among others.

In one embodiment of the present application, video systems are employed during the test (or assessment) period with paper-based systems such as currently used in existing educational management systems, and will be described as such. In other embodiments, a video system is employed with electronic-media versions of existing educational management systems. Where for example, students employ computing devices such as but not limited to electronic tablets, computer laptops, and desktop computers, and where in some embodiments the computing devices have built in video cameras. It is to be understood video may also, in some embodiments, generate still images which may be viewed and used in the present system.

Figure 3:
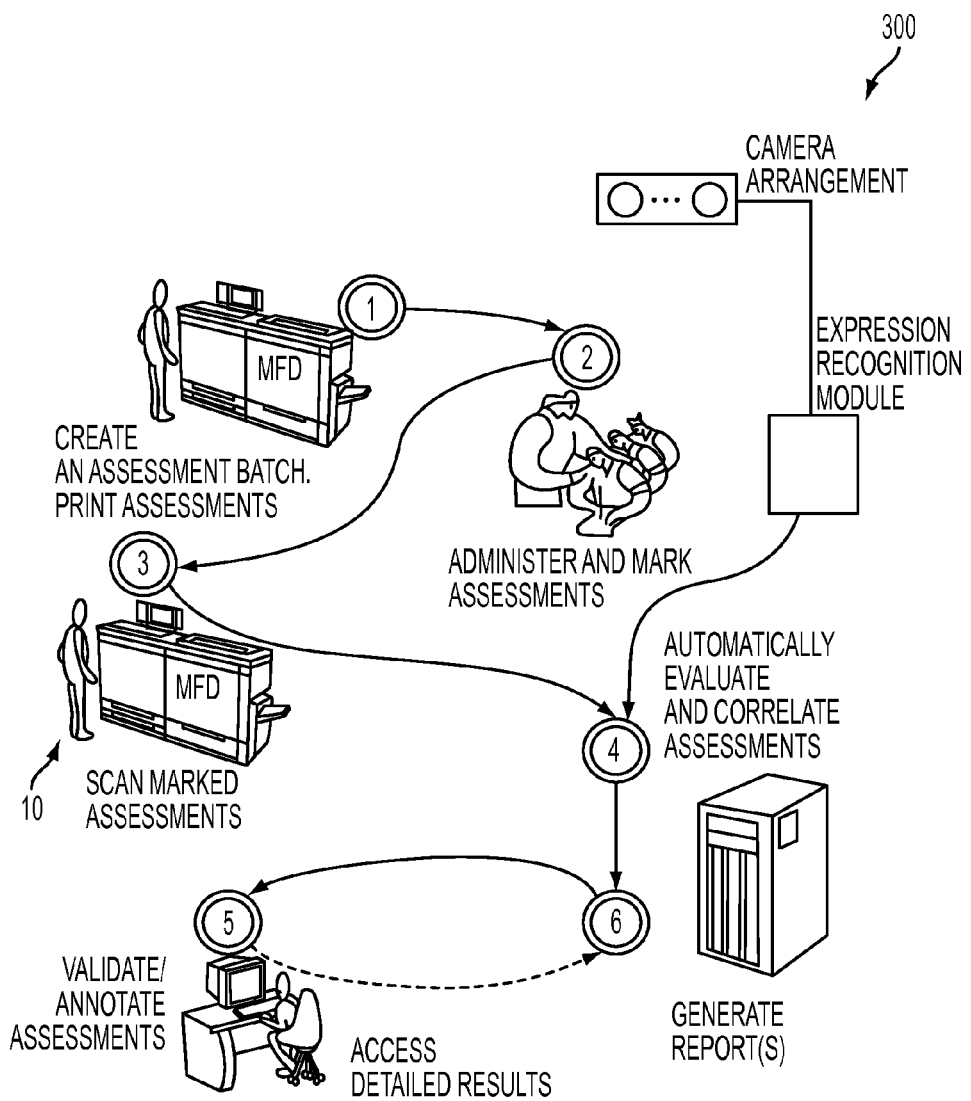
FIG. 3 is a pictorial diagram of the method flow for an educational management system according to the present application.

Turning to FIG. 3, depicted is an overview of the functional operation of a method 300 according to the present disclosure for a paper based educational management system employing a video camera arrangement (e.g., video-based teaching aid). More particularly, in addition to the flow shown in FIG. 1, the system of FIG. 3 includes a video camera arrangement configured to record video images of at least some of a plurality of people in a classroom setting.

The video camera arrangement may include a single video camera, as well as a plurality of video cameras. The video camera arrangement is focused on the students, a sub-set of the students, the teacher, and/or a combination of the foregoing. The generated video images are provided to an expression recognition module which includes the capability of identifying expressions (facial and/or body pose) of the people in the video images recorded by the video camera arrangement. In one embodiment data from the expression recognition module is associated with information (e.g., assessment or test information) at station 4. In this embodiment, an event or an outcome of an event is correlated with the expression recognition information (as will be discussed in more detail below). By way of example, an event may be but is not limited to teaching a specific topic or set of topics, conducting a question-and-answer session on a specific topic or set of topics, conducting a teach-back session on a specific topic or set of topics, and conducting an assessment of students via an assignment or test.

Thereafter, the information regarding the evaluated assessments which are correlated with the expression recognition information are provided to station 5 where the user (i.e., teacher or other educator) validates and/or annotates the assessments that have been correlated with the expression recognition information in order to generate reports at station 6.

Figure 4:
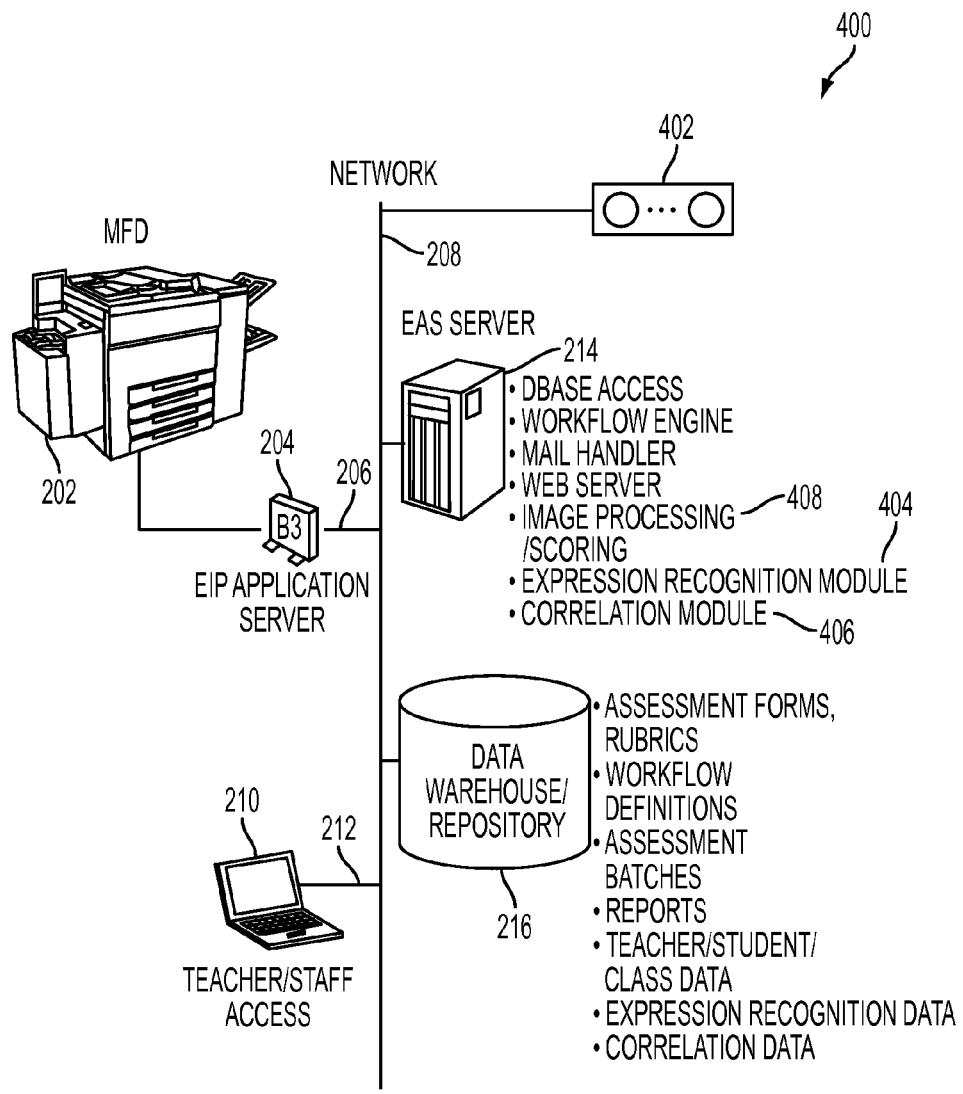
FIG. 4 is a diagram of the general configuration of the system architecture for the educational management system of FIG. 3.

Referring to FIG. 4, the overall architecture of a system 400 for the method described in FIG. 3 is illustrated. The architecture of FIG. 4 is shown to have similarity to that of FIG. 2. However, the network of FIG. 4, incorporates video camera arrangement 402, which may be a single as well as multiple video cameras. Further, system server 214 is configured to include an expression recognition module 404, which receives the image data from video camera arrangement 402 to identify facial and/or body expressions of people within the setting (e.g., the classroom). Also illustrated in FIG. 4 is a correlation module 406 also found on server 214. Information from the expression recognition module 404 is correlated, via the correlation module 406, with information regarding an event or an outcome of an event from the image processing/scoring module 408, in order to correlate the captured visual expressions to results of the assessments. The data or information generated by the expression recognition module 404 and the information or data generated by the correlation module may be stored, in one embodiment, on the data warehouse/repository 216. It is to be appreciated that the foregoing physical arrangement is simply one embodiment, and other arrangements may be used. For example, in an alternative embodiment the expression recognition module 404, the correlation module 406, etc. may be located on a server separate from server 214, and the resulting data or information may be stored at a location other than the data warehouse/repository 216. It is to be appreciated the network 208 may be a wireless and/or wired network arrangement.

Figure 5:
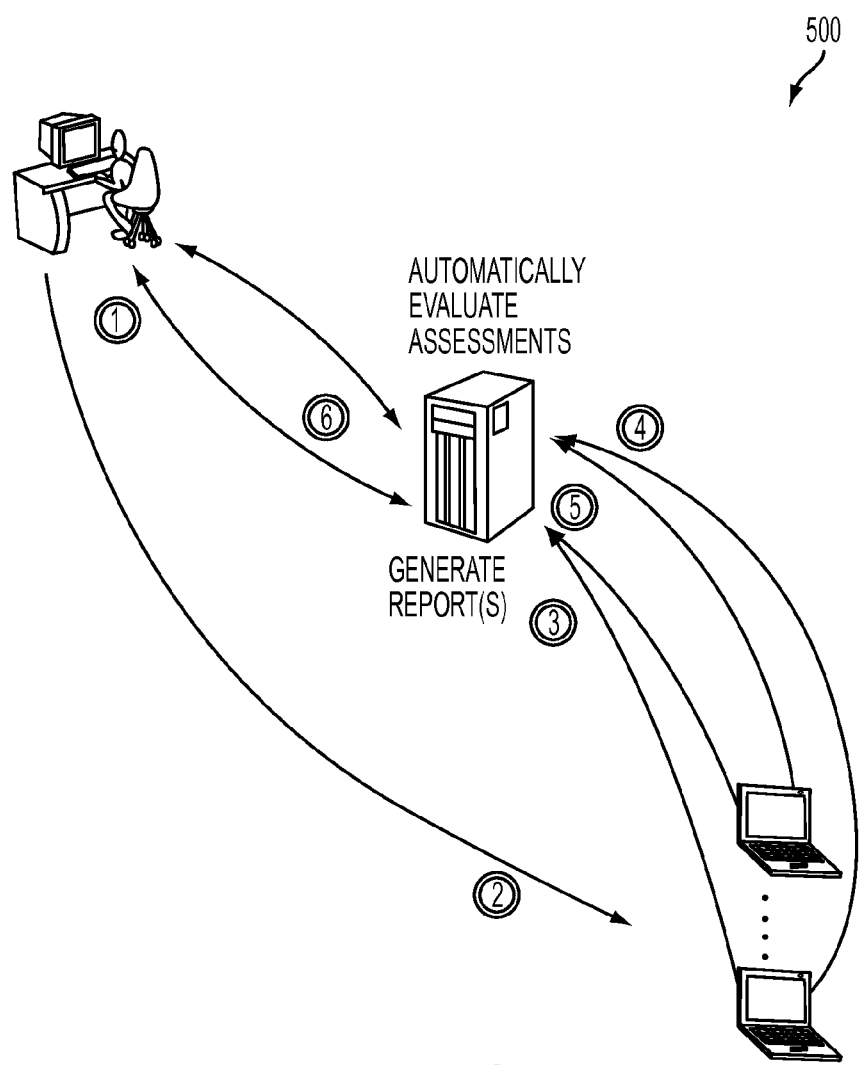
FIG. 5 is a pictorial diagram of a further embodiment for the method flow of an educational management system according to the present application.

Turning to FIG. 5, depicted is an overview of the functional operation 500 of another embodiment for a method for operation of a video based educational management system (e.g., a video-based teaching aid).

In this embodiment, the paper/manual process of administering assessments is not used, but rather the administering of assessments is accomplished electronically. More particularly, as shown in FIG. 5, at station 1, the teacher generates the assessment at their own electronic device, e.g., personal computer, laptop, tablet etc. The teacher is in communication with a server wherein a database of assessments are stored (alternatively the assessments are stored on the teacher's own electronic device). The teacher downloads the selected assessments, generates an assessment (e.g., test) and electronically forwards the assessment at station 2 to the students. The students have individual electronic devices, such as laptops, electronic tablets, personal computers or other electronic devices on which they receive the electronically transmitted assessment. In this embodiment the electronic devices have video cameras incorporated therein and which are part of a video camera system that is capable of tracking students' facial and/or body expressions in real time, as they are completing the electronic assessment. While it is noted here the system is capable of operating in real time, expressions do not need to be determined in real time. Rather, the system can also work with video that has been recorded at an earlier time.

The students take the assessment and download their answers to an assessment accepting module, which is found on the server (station 3). During the time the students are taking the assessment, the video cameras on the individual electronic devices are recording video images of the students, and these video images are provided to an expression recognition module, also carried on the server (station 4). Thereafter, both the assessments and expression recognition information are provided to a correlation module, found on the server, that correlates the expressions in the video images to the electronically submitted student answers (e.g., to keystrokes that correspond to the electronically submitted student answers) (station 5). Finally, an output including the correlated images of student expressions and student responses is generated by the server and is made available to the teacher and/or out to the network, via an output device, e.g., a screen of the teacher's computing device, (station 6).

Figure 6:
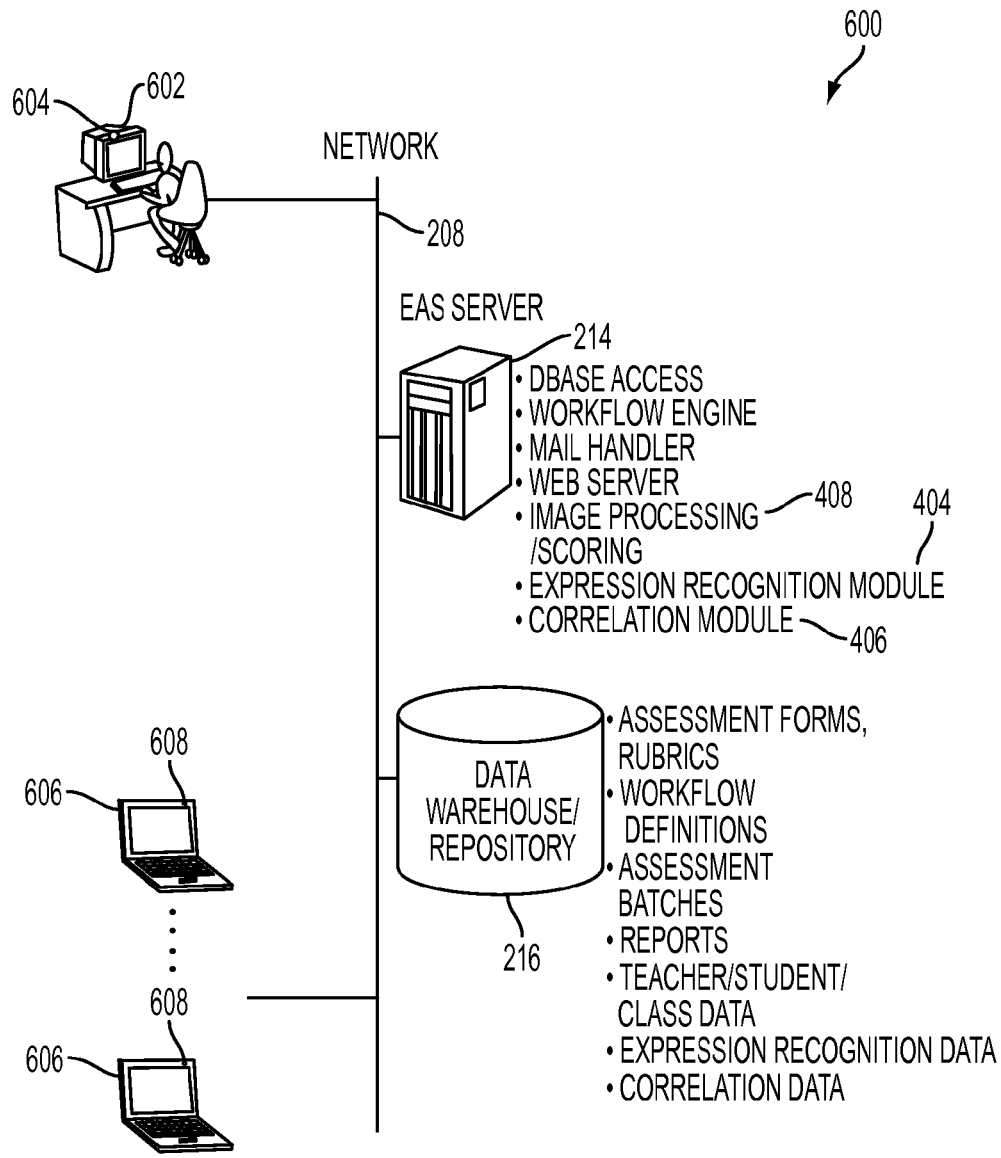
FIG. 6 is a diagram of the general configuration of the system architecture for the educational management system of FIG. 5.

Turning to FIG. 6, illustrated is architecture of a system 600 according to the method described in connection with FIG. 5. In this embodiment, FIG. 6 shows that the teacher's computing device 602, optionally includes a video camera 604, and the individual computing devices 606 of the students computing devices also include video cameras 608, where the computing devices and video cameras are configured to interact with the system server 214. Further, the computing devices 602, 606, video cameras 604, 608, the server 214, along with a system data warehouse repository 216, are interconnected via a network 208, which although shown with wired type connections is understood to be configurable as a wired and/or a wireless type network. Additionally, although the teachers computing device 602 is shown as a personal type computer and the students computing devices are shown as laptop type devices, it is understood these may be other computing devices including tablet type computers among others. In this embodiment, the assessment accepting module, expression recognition module, and the correlation module are shown to be on the server 214. It is to be appreciated in other embodiments at least some of the modules may be located on separate servers, and/or on the teacher's and/or on students' computing devices.

It is to be appreciated that aspects of the embodiments discussed above may be combined. For example, in the embodiment where the students have electronic computing devices (FIGS. 5 and 6), a separate camera system, such as depicted in FIG. 3, may still be employed. In this way there would be a capability of synchronizing a student's facial expressions with what is being taught by the teacher (i.e., the camera system of FIG. 3 would be focused at least in part on the teacher). Also, in an embodiment that combines aspects of FIGS. 3 and 5, focusing at least a part of the camera system on the students (in addition to the video cameras in their electronic computing devices) would allow for an overall view of their body language that would also be correlated to their facial expressions.

As can be understood from the foregoing, a particular aspect of the present application is to employ video-based expression recognition to assist in the teaching process.

Methods for video-based expression recognition are known. One particular process is taught for example by U.S. patent application Ser. No. 13/598,098, titled A Method And System For Automatically Recognizing Facial Expressions Via Algorithmic Periocular Localization, Shreve et al., hereby fully incorporated by reference herein.

Additionally, others have discussed and disclosed aspects of pose recognition (body language); such as in an article by Xiangxin Zhu and Deva Ramanan, titled: Face Detection, Pose Estimation, and Landmark Localization in the Wild, CVPR 2012. This article describes face poses only, but the concepts described therein can be generalized to obtain "body language" data, and an article by P. Chippendale, titled: Towards Automatic Body Language Annotation, Automatic Face and Gesture Recognition 2006. FGR 2006. 7$^{th}$ International Conference, both of which have been incorporated by reference herein in their entirety.

With attention to the Ser. No. 13/598,098 Shreve et al. patent application, as an example, employed are two main stages in the facial recognition method. The first stage is an offline training stage, which learns from hundreds of examples of each expression to train a classifier. The second is an online stage that runs on separate data than the training stage and classifies each facial expression into one of several categories based on the generalizations learned in the first stage.

Both process stages share many steps which are described below.

Figure 7:
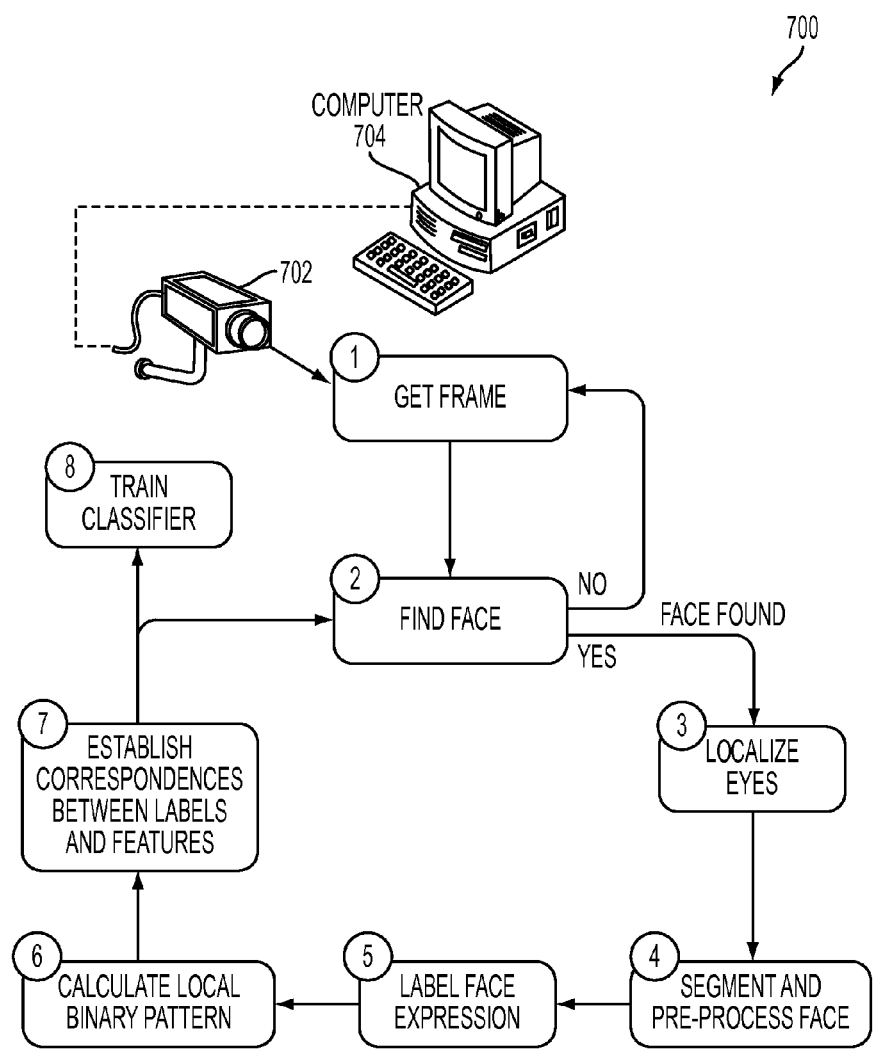
FIG. 7 is a block diagram of an offline processing stage for an image recognition system.

Turning to FIG. 7, depicted is an offline training process stage 700, which includes steps that:
1. Acquire a surveillance video sequence using at least one video camera 702 operatively connected to a computer 704 (GET FRAME 1);
2. For a given frame in the video sequence, detecting one or more faces if present in the video image (FIND FACE 2);

3. For at least one detected face, automatically localize the periocular region and segment the facial region of the image based on geometric ratios (LOCALIZE EYES 3);
4. Process each face image to increase robustness to lighting and scale variation (SEGMENT AND PRE-PROCESS FACE 4);
5. Assign each detected face to an expression category or label LABEL FACE EXPRESSION 5);
6. Calculate representative features for the face image (CALCULATE BINARY PATTERN 6);
7. Determine a correspondence between the representative features and the expression category (ESTABLISH CORRESPONDENCE BETWEEN LABELS AND FEATURES 7);
8. Repeat the labeling steps until all faces of interest have been processed resulting in a labeled feature set, (Go to FIND FACE 2) and
9. Train a classifier using the labeled feature set (TRAIN CLASSIFIER 8).

Figure 8:
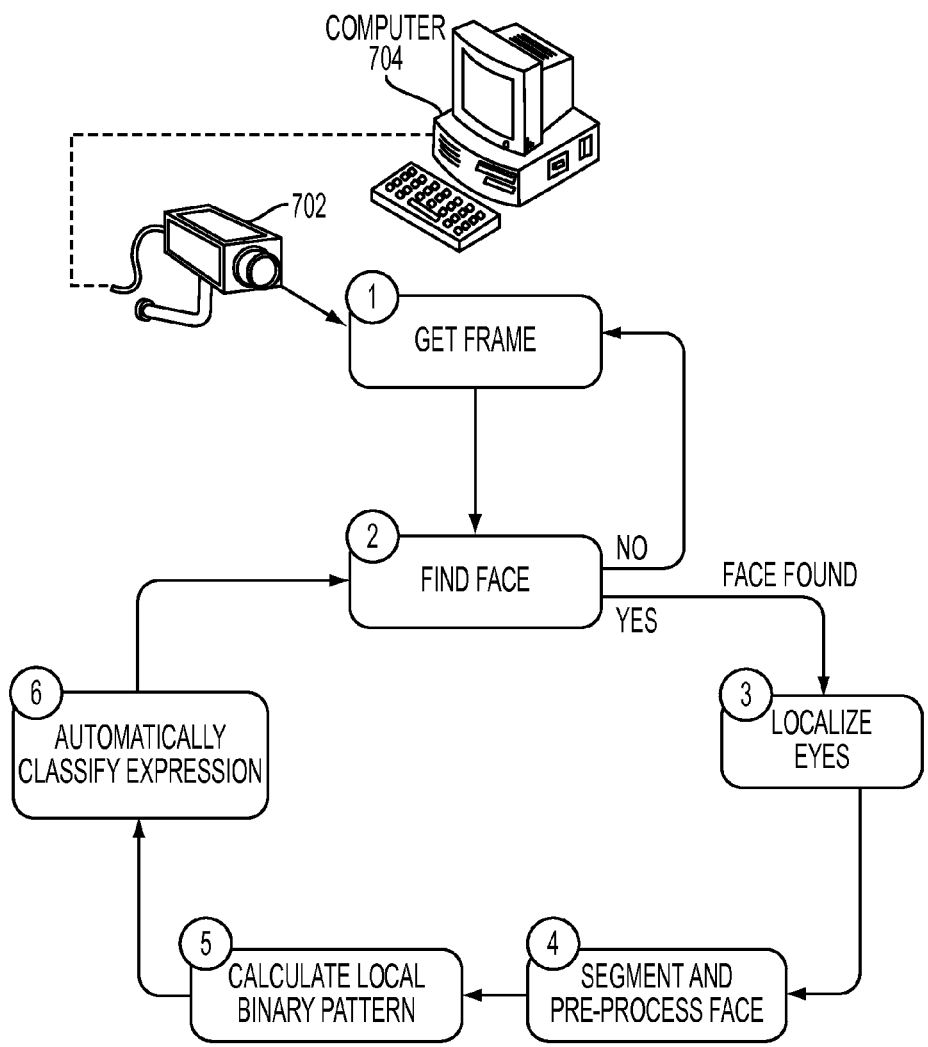
FIG. 8 is a block diagram of an online processing stage for an image recognition system.

Once the training stage has been completed the system is ready for an online process stage 800 as shown in FIG. 8 and includes steps that:
1. Acquire a surveillance video sequence using at least one video camera 702 operatively connected to a computer 704 (GET FRAME 1);
2. For a given frame in the video sequence, detect one or more faces if present (FIND FACE 2);
3. For a detected face, automatically localize the periocular region and segment the facial region of the image based on geometric ratios (LOCALIZE EYES 3);
4. Process each face image to a suitable lighting and scale condition (SEGMENT AND PRE-PROCESS FACE 4);
5. Calculate the representative features used in the offline process for face images (CALCULATE LOCAL BINARY PATTERN 5); and
6. Automatically classify the expression of the face using the features and the trained classifier generated in the offline training stage. (AUTOMATICALLY CLASSIFY EXPRESSION 6)

According to one exemplary embodiment in Shreve et al., facial expressions are monitored over time to determine if an expression tends to be more positive (e.g. happy, surprised) or negative (e.g. angry, sad, disgusted) at various times during the taking of the test (and/or during a lecture etc.), or neutral.

Since these methods involve a training stage, it is possible to include a wide range of expressions by including them in the training stage. Thus expressions required for the present concepts can be included as necessary. For example, in one embodiment the identifying expressions operation further includes training the expression recognition module to identify image expressions using the images of at least some of the people in the video images, wherein at least some of the people in the video image are in the classroom on a repeated basis, and the expressions being identified have been labeled (automatically or manually) or otherwise identified.

Expression Recognition Module Used in Learning Evaluation (Context: Administering an Assessment)

The following describes utilizing an expression module in the present system and method during learning evaluation (i.e. during an assessment period) to assist the teacher for future educational planning. Without loss of generality, the following is described in connection with an embodiment using a computing device based system (e.g., tablet-based system, a laptop computer based system, among others) as the example learning evaluation tool. The method of one embodiment proceeds as follows:

1. Data collection: During the evaluation period, four sets of information (e.g., data sets) are collected and synchronized (e.g., correlated): the item (e.g., question or specific assessment), the score (e.g., defining the accuracy of the answer or how close is the answer to the correct answer), the time spent on the item, and the facial and/or body expression (e.g., during the assessment). The first two sets of information belong to conventional learning evaluation. The other two comprise aspects derived from the recorded video segments (e.g., via video camera located on the computing device) and post-processed by automated algorithms of image or expression recognition systems (e.g., such as but not limited to U.S. patent application Ser. No. 13/598,098, titled A Method And System For Automatically Recognizing Facial Expressions Via Algorithmic Periocular Localization, Shreve et al).

It is to also be appreciated if the delivery method of the assessment is electronic (vs., for example, paper-based) the time spent on an item can be determined by means other than just from recorded video segments. For example, in at least one embodiment, a timer incorporated into the assessment to keep track of how long a question is displayed to a student.

In certain embodiments all four data sets are collected and synchronized (or correlated), while in other embodiments only two or three of the data sets are correlated with each other.

2. Data analyses and cleaning: Given the augmented set of features obtained by the above step, a variety of data analyses and cleaning is performed. For example, the simple statistics of confused expressions alone can be helpful. Correlations between expressions (e.g. confused) with each student's score and/or with the time spent can be used by the teacher.

This information is also useful for anomaly (outliers) detection, where detected anomalies are used to prompt the teacher's attention and/or for data cleaning (e.g. confused expression should not correlate positively with high assessment score).

Further useful obtained data, including time-series of certain expressions (e.g. confused) or progression of expression changes is also data that is useful in the teaching process. For example, if negative expressions of students intensify as time progresses, this may be taken as an indication that a test is too long. Distribution of certain expressions (e.g. confused expressions which are clustered around a particular group of problems may indicate the problems were confusingly drafted) is also a useful indicator.

3. Data presentation: Depending on the inputs/use-cases given by the teacher, different data visualizations can be performed. In one embodiment, histograms of facial and/or body expressions associated with a particular item, a selected group of items, or all items, for students with correct answers and for those with incorrect answers are displayed on an output device for comparison.

In another scenario, the histogram of confused expressions and the histogram of number of students with correct answers for all items are displayed and compared.

In yet another scenario, a matrix plot comprising a color coded map of facial expressions is displayed. In this matrix plot, the row index is the student name while column index is the item number (or vice versa). In other embodiments each matrix entry is the color code corresponding to a given facial expression or class of expressions. The entries of the map may also be turned on or off depending on the item score (e.g., correct, partial credit, incorrect, or skipped). This plot can help the teacher quickly identify notable patterns that can help improve future educational planning. For example, if a problem or a student is consistently associated with a confused expression, that information can be useful to the teacher.

Most of the above information may be presented to the teacher at a later time, e.g., at the end of each day. However, for some applications, it may be preferable to present the data in real-time, e.g., direct feedback during class time may provide assistance to the teacher, especially with large class sizes.

4. Data mining and modeling: In certain embodiments standard data mining and modeling techniques are applied to the augmented sets of features collected over multiple assessments. The results are then used to identify topics that are most or least familiar to the students as a whole, identify students that may require additional attention and the teaching of topics where these specific students (or student) need(s) more attention, etc.

For learning evaluations conducted through an electronic computing device (e.g., tablet, laptop, etc.) data collection and follow-up analyses including facial expression analyses and other typical existing educational management system analyses can be seamlessly integrated into the computing device. For paper-based learning evaluations, similar processes can be applied, but some additional steps are needed to synchronize the collection of the four sets of features (e.g. via video capture of the facial and/or body expression as well as a view of the paper sheet and the motion of a hand or the hand-writing).

Facial Expression Module Used in Typical Learning Sessions (Context: Teaching a Class)

Now will be described embodiments of using the image or expression (e.g., facial and/or body language) recognition module during typical learning sessions (e.g., in class), to assist teachers in future educational planning. This method proceeds as follows:

1. Data collection: Without loss of generality, in one embodiment it is assumed two video cameras (which may be pan-tilt-zoom, PTZ, cameras, among other configurations) are mounted in the classroom for the required image/video acquisition, one camera being aimed at the teacher and the other camera aimed at the students. During the learning session, student facial expressions and/or body poses are gathered from the video of the students. The video of the teacher is intended primarily for synchronization, i.e., to provide context to the behavior of the students.

In an alternative embodiment, a single video camera is used, aimed at the students only, and the synchronization is performed using audio of the teacher, gathered from the single video camera. Other configurations in which the actions of the teacher are determined in addition to video images of the teacher and audio recordings of the teacher, include a manual input; and being surmised from an included time stamp and syllabus data.

2. Data analyses: Various data analyses and cleaning are performed on the collected facial expression data. Unlike the previous scenario used in assessment, where positive and negative ground-truth can be gathered directly from the score, the ground-truth is more subtle in this teaching scenario. One embodiment analyzes correlations among learning sessions with positive facial expressions (e.g. happy, excited) and with negative expressions (e.g. bored, confused). Another process is to post-correlate with the corresponding assessments after the teaching session.

3. Data presentation: Depending on the inputs/use-cases given by the teacher, different data visualizations can be performed. In one example scenario, the histograms of facial expressions of a particular learning session, a selected group of learning sessions, or all learning sessions are displayed and compared.

In another example scenario, a matrix plot comprising a color coded map of facial expressions is displayed, as discussed in the previous scenario. This plot can help the teacher quickly identify notable patterns that can help improve future educational planning. For example, a learning session or a student that is heavily correlated with negative expressions will indicate useful information to the teacher.

4. Data mining and modeling: Standard data mining and modeling techniques can be applied to the facial expression data collected over multiple learning sessions. The results can be used to identify topics that are most or least familiar to the students, identify students that may require additional attention as well as topics where attention is needed, etc. Furthermore, the mining and modeling can be done jointly with the corresponding assessment sessions for each learning session.

It is to be appreciated that the synchronization for collecting the above discussed features can be accomplished in various ways. For example, an audio cue from the teacher is a straightforward method, but requires the teacher to adapt to such procedures. For another example, a rough automated synchronization based on the schedule/plan of each learning session plus a manual fine adjustment by the teacher can be effective as well. For yet another example, complicated automated methods for topic discovery and action recognition can be applied as well, if the performances of current state-of-the-art methods are sufficient.

Customization of Educational Expression Recognition Module

Though much progress has been made in vision-based facial and body expression, there are still challenges in various areas such as the ability to recognize micro-expressions (subtle expressions), robustness against subject-to-subject variations (including gender, race, ethnicity, age, and cultural background, and especially individual variation), etc. Thus further system improvements are obtained with improvement of automated facial and/or pose expression methods. Alternatively, improvement may also be obtained by use of manual labeling as input to existing machine-learning algorithms. Fortunately, in this application space (i.e., educational management), the students and teachers involved are a substantially fixed group over a reasonably long period of time (i.e., the same individuals are involved over a period of several months to a year, and systematic progression occurs year-over-year) so there is significant opportunity to exercise machine-learning algorithms on the specific data set, thereby enabling compensation for individual differences.

Furthermore, a linkage exists between these detected expressions to known outcomes (positive, neutral, and negative) from the results of learning effectiveness, and these are recorded as have been proposed. Utilizing these characteristics, an improved facial and/or expression recognizer can be constructed for educational settings. For example, one can start with a known automated facial and/or body expression method, to obtain a first estimate of labeling of facial and/or body expressions in learning evaluation session(s).

Then the correlations between initial labeling of facial and/or body expressions and the assessment scores are calculated. In this embodiment, assuming that positive and neutral expressions correlate positively with scores and negative and neutral expressions correlate negatively with scores, one can (1) identify anomalies and request manual labeling (of training samples, in order to improve the classifier) and (2) validate non-anomalous situations. The known automated facial and/or body expression methods for educational applications can thereby be fine-tuned. This process can be accomplished at a very low effort since anomaly detection is one of the described steps of the present method (thus the data comes for free but perhaps at an uncontrolled rate).

For another example, since the set of subjects (students from a particular classroom) is relatively small, it is possible to manually label facial and/or body expressions for every student and then re-train the facial and/or body expression recognizer specifically for each class or for each student. Additionally, one can use image recognition methods (e.g., such as the method described U.S. patent application Ser. No. 13/598,098, titled A Method And System For Automatically Recognizing Facial Expressions Via Algorithmic Periocular Localization, Shreve et al.) as a first estimate to help speed up the manual labeling as in the previous example. In particular, since the set of subjects is mostly fixed over a reasonable length of time and there is linkage between initial facial and/or body expression estimates and the effectiveness of learning, there are many opportunities to customize the facial and/or body expression module for educational applications (e.g., where in one embodiment customizing comprises training the expression recognition module based on the expressions of a specific group of people, such as students in a classroom). The labeling can in some embodiments be accomplished by the teacher. Particularly at the start of the school year the teacher may review student expressions and provide labeling to improve the process. Such labeling does not need to be undertaken throughout the year as the initial labeling actions will generally be sufficient for the algorithm learning process.

Additionally, a concern in the educational setting is the issue of privacy. In one embodiment steps are provided to mitigate privacy concerns. For example, video images are deleted promptly after the facial and/or body expression data has been collected, to minimize any potential misuse of the video. Alternatively, encryption/distortion may be applied to the acquired videos to further safeguard the privacy.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method using a video based teaching aid, the method comprising:
(I) performing an off-line training process, which includes:
  (i) acquiring a surveillance video sequence using at least one video camera operatively connected to a computer;
  (ii) for a given video image frame in the video sequence, detecting one or more face images present in the video image frame;
  (iii) for at least one detected face image, automatically performing facial region operations;
  (iv) processing each detected face image to increase robustness to lighting and scale variation;
  (v) assigning each detected face image to an expression category or label;
  (vi) calculating representative features for the face image;
  (vii) determining a correspondence between the representative features and the expression category or label;
  (viii) repeating the expression category or labeling steps of (ii)-(vii) until all faces of interest have been processed resulting in a labeled feature set; and
  (ix) training a classifier using the labeled feature set;
(II) performing online operations which include:
  (i) recording video images of at least some of a plurality of people in a classroom setting by use of a video camera arrangement;
  (ii) identifying expressions of the people in the video images by use of an expression recognition module configured to receive the video images from the video camera arrangement, the identifying including automatically localizing, for at least one detected frame including a human face image, a periocular region associated with the human face image and segmenting a facial region of the frame including the human face image based on geometric ratios about the periocular region;
  (iii) correlating the identified expressions of the people in the video images with at least one of an event or an outcome of an event, including but not limited to taking a test, occurring in the classroom setting by use of a correlation module;
  (iv) automatically classifying the identified expression using the identified expressions and the trained classifier generated in the off-line training stage;
  (v) outputting results of the correlating by an output device, wherein the recording of the video images includes obtaining a time-series or progression of facial expression changes during a teaching process, including a negative facial expression progression of people in the classroom which intensifies as time progresses, wherein this is interpreted by the output as a negative indication regarding the test, and wherein the recording of the video images includes, identifying a distribution of confused expressions of people taking the test clustered around a particular group of questions, wherein the output identifies this as an indication the particular group of questions were confusingly drafted.

2. The method according to claim 1, wherein the identified expressions comprise gestures and eye movements.

3. The method according to claim 1, wherein the outcome comprises a score, ranking, or other evaluation metric achieved on an assessment, assignment, or test.

4. The method according to claim 1, wherein the expressions are identified as being one of: confusion, frustration, relief, calmness, or panic, positive, negative, and neutral expression.

5. The method according to claim 1, wherein the correlating and outputting occur during or after one or more teaching sessions, at which at least some of the people in the classroom are students.

6. The method according to claim 1, wherein the correlating and outputting occur after an assignment has been completed by at least some of the people in the classroom.

7. The method according to claim 6, wherein the correlating and outputting occurring after the assignment has been completed are further correlated with actions of the teacher in the classroom and expressions of the students in the classroom during one or more learning sessions prior to the assignment.

8. The method according to claim 1, wherein at least one of the people in the classroom is a teacher and other ones of the people in the classroom are students, and further including correlating actions of the teacher in the classroom to expressions of the students in the classroom during a learning session, the actions of the teacher determined from video images of the teacher obtained by the video camera arrangement including at least one camera pointed at the teacher and at least one camera pointed at the students, wherein the video images of the teacher are used to synchronize to the behavior of the students.

9. The method according to claim 1, wherein the identifying expressions operation further includes training the expression recognition module to identify image expressions using the images of at least some of the people in the video images, wherein at least some of the people in the video image are in the classroom on a repeated basis, and the expressions being identified have been labeled.

10. The method according to claim 1, wherein the correlating is done by analysis of a plurality of data sets, the data sets including at least two of: (i) an item on an assessment; (ii) a score defining the accuracy of an answer to the item by a given student; (iii) a time spent on the item by the student; and (iv) expression of the student during the assessment.

11. The method according to claim 10, further including performing data cleaning of at least some of the data sets based on at least one of: outliers identified by said correlation module or manual input by the teacher.

12. The method according to claim 10, wherein the correlating is done on the basis of: individual students; pre-selected sub-groups of students; an entire class; or multiple classes.

13. The method according to claim 1 further including performing at least one of data mining and modeling using the outputted results, in order to identify topics that are familiar to the students as a whole or identify students who may require additional attention and the topics where these specific students need more attention.

14. The method according to claim 13 further including customizing of the expression recognition module, wherein the customizing comprises training the expression recognition module based on the expressions of a specific group of the people.

15. The method according to claim 14 wherein the specific group of the people is a specific student in a classroom.

16. A video-based human expression recognition system for use in a classroom setting, the system comprising:
(I) an off-line training arrangement, which includes a computer video system configured to:
  (i) acquire a surveillance video sequence using at least one video camera operatively connected to a computer of the computer video system;
  (ii) detect, for a given video image frame in the video sequence, one or more face images present in the video image frame;
  (iii) perform automatic facial region operations for at least one detected face image;
  (iv) process each detected face image to increase robustness to lighting and scale variation;
  (v) assign each detected face image to an expression category or label;
  (vi) calculate representative features for the face image;
  (vii) determine a correspondence between the representative features and the expression category or label;
  (viii) repeat the expression category or labeling steps of (ii)-(vii) until all face images of interest have been processed resulting in a labeled feature set; and
  (ix) train a classifier using the labeled feature set;
(II) an online recognition system which includes:
  (i) a video camera arrangement configured to generate and capture video images of people in a classroom setting;
  (ii) a server including first circuitry of a facial recognition module to receive the video images from the video arrangement and to determine expressions of the people in the video images and the server further including second circuitry of a facial expression correlation module, which correlates the defined expressions of the people in the video images with events or outcomes of events occurring in the classrooms, wherein operation of the facial recognition module identifies expressions, wherein the identifying includes automatically localizing, for at least one detected frame including a human face image, a periocular region associated with the human face image and segmenting a facial region of the frame including the human face image based on geometric ratios about the periocular region, and the facial expression correlation module further configured to provide the correlation by use of circuitry that classifies the facial expression by use of the identified expressions and the trained classifier generated by the off-line training arrangement;
  (iii) a data warehouse repository designed to store the determined expressions of the people in the video images and the correlation between the defined expressions of the people in the video image with the events or outcomes of the events occurring in the classroom; and
  (iv) an output device configured to output results stored in the data warehouse repository, for use by a user and wherein the output device is further configured to provide expression results to a teacher in substantially real time.

17. The system according to claim 16 wherein the video camera arrangement includes one or more cameras.

18. The system according to claim 16 wherein the video camera arrangement includes video cameras incorporated within computing devices provided to the people in the classroom setting.

19. A method for using a video based teaching aid within a computing device based teaching system which employs a video camera incorporated in computing devices of the computing system, the method comprising:
(I) performing an off-line training process, which includes,
  (i) acquiring a surveillance video sequence using at least one video camera operatively connected to a computer;
  (ii) for a given video image frame in the video sequence, detecting one or more face images present in the video image frame;
  (iii) for at least one detected face image, automatically performing facial region operations;

(iv) processing each detected face image to increase robustness to lighting and scale variation;
(v) assigning each detected face image to an expression category or label;
(vi) calculating representative features for the face image;
(vii) determining a correspondence between the representative features and the expression category or label;
(viii) repeating the expression category or labeling steps of (ii)-(vii) until all faces of interest have been processed resulting in a labeled feature set; and
(ix) training a classifier using the labeled feature set;
(II) performing online operations which include:
(i) presenting a test, consisting of questions, to people in a classroom setting, wherein the test is provided to the people on the computing devices;
(ii) during an evaluation period, configuring the methods to collect four sets of information including,
answers provided by the individual people to whom the test questions were presented,
a score achieved by answering the questions on the test, by each of the people individually,
an amount of time spent on the test by each of the people individually, and
recording facial and/or body expressions occurring by each of the people individually during the test as video images by use of the video cameras;
(iii) identifying the expressions of the people in the video images by use of an expression recognition module configured to receive the video images from the video cameras;
(iv) automatically classifying the identified expression using the features and the trained classifier generated in the off-line training stage;
(v) correlating the identified expressions of the people in the video images with the questions presented in the test, the score achieved by the people answering the questions on the test, and amount of time spent on the test by use of a correlation module;
(vi) incorporating a timer into the evaluation period configured to track a length of time a question is displayed on the computing devices to the people taking the test; and
(vii) outputting a matrix plot or map comprising displayed facial expressions and peoples' names, wherein one of a row or column index lists the peoples' names in the classroom, and the other one of the row or column index provides facial expressions color coded to indicate the expression from a class of expressions.

20. The method according to claim 19 further including obtaining a time-series or progression of facial expression changes during the teaching process, including a negative facial expression progression of people in the classroom which intensifies as time progresses, wherein this is interpreted by the method as a negative indication regarding the test.

21. The method according to claim 19 further including from the video image identifying a distribution of confused expressions of a number of different people taking the test clustered around a particular group of questions, wherein the method identifies this as an indication the particular group of questions were confusingly drafted.

* * * * *